UNITED STATES PATENT OFFICE.

JOSIAH CLIFTON FIRTH, OF AUCKLAND, NEW ZEALAND.

INSULATOR.

SPECIFICATION forming part of Letters Patent No. 436,225, dated September 9, 1890.

Application filed April 24, 1890. Serial No. 349,336. (No specimens.) Patented in New Zealand April 3, 1890, No. 4,319; in Victoria April 23, 1890, No. 7,660; in South Australia April 24, 1890, No. 1,880; in New South Wales April 25, 1890, No. 2,161; in Queensland April 26, 1890, No. 762; in England April 29, 1890, No. 6,555; in France May 6, 1890, No. 192,328, and in Belgium May 6, 1890, No. 90,465.

*To all whom it may concern:*

Be it known that I, JOSIAH CLIFTON FIRTH, a subject of the Queen of Great Britain, now residing at Auckland, New Zealand, have invented a new and useful Improvement in Insulators, (which has been patented in New South Wales, No. 2,161, April 25, 1890; in New Zealand, No. 4,319, April 3, 1890; in South Australia, No. 1,880, April 24, 1890; in Victoria, No. 7,660, April 23, 1890; in Queensland, No. 762, April 26, 1890; in France, No. 192,328, May 6, 1890; in England, No. 6,555, April 29, 1890, and in Belgium, No. 90,465, May 6, 1890,) of which the following is a full, clear and exact description.

By the term "insulator" is here meant to be implied a non-conductor of heat and protector against wet and damp.

The invention is mainly designed to be applied to structures of various kinds for the purpose of excluding or retaining heat or cold, excluding damp and wet, and for fireproofing purposes; and it consists in a packing composed of pieces of pumice-stone reduced to lumps of regulated sides filled in between and fixed in stable relation by granular pumice-stone, as hereinafter described.

In applying pumice as a lining or packing between inner and outer walls of various structures or vessels for excluding or retaining heat or cold, excluding wet and damp, and for making such structures or vessels fireproof, I use the pumice in lumps of regulated size, preferably about the size of a pigeon's egg, so as to pack into spaces of varing contour. The sizes may vary, however, somewhat above and somewhat below these dimensions; but in order to hold them in stable relation against looseness the spaces between are filled in with granular or powdered pumice-stone.

This invention is designed to include what are known as "cool" rooms or chambers, refrigerators of ships, including steamers, railway and other carriages, also cool rooms or chambers in establishments on land for the preservation of meat, fruit, cheese, butter, and other perishable articles, likewise safes, strong rooms, and safety-deposit buildings for making the same impregnable against fire. The advantages of pumice-stone for this purpose are that it has imprisoned large bodies of air in its cellular structure, which is a non-conductor. It is practically infusible itself and a non-conducting mineral, does not oxidize or decompose under influences of heat or moisture, is not subject to spontaneous combustion and fungous growth, as is charcoal and other organic substances, and, moreover, is very light, which is of great value when used in the construction of ships.

Having thus described my invention, what I claim as new, and desire to secure by Letters Patent, is—

An insulator or non-conducting packing for the lining of chambers or vessels for the retention or exclusion of heat or cold, consisting of pieces of pumice-stone reduced to lumps or coherent masses of regulated sizes packed together and held in fixed relation with a filling of granular pumice-stone, as set forth.

In testimony that I claim the foregoing as my invention I have signed my name, in presence of two witnesses, this 21st day of March, 1890.

JOSIAH CLIFTON FIRTH.

Witnesses:
WALTER GREENSHIELDS,
C. OVERTON.